United States Patent Office 3,776,859
Patented Dec. 4, 1973

3,776,859
AUTOMOTIVE EXHAUST CONVERSION
CATALYST
Edgar Alan Simpson, Severna Park, Md., assignor to
W. R. Grace & Co., New York, N.Y.
No Drawing. Filed Feb. 28, 1972, Ser. No. 230,072
Int. Cl. B01f *11/06, 11/12*
U.S. Cl. 252—462                                    5 Claims

ABSTRACT OF THE DISCLOSURE

A process for improving the thermal stability of auto exhaust conversion catalyst prepared by deposition of a coating containing the catalyst components on a relatively inert base, in which the coating composition is stabilized in a manner such that the catalyst composite can withstand temperatures as high as 1800° to 2000° F. without loss of activity.

BACKGROUND OF THE INVENTION

The recent emphasis on the preparation of catalysts capable of converting the noxious components of automotive exhaust to innocuous entities has led to research in several related areas. The catalyst for conversion of an automotive exhaust must have several characteristics. It must, of course, be active for conversion of hydrocarbons and carbon monoxide over long periods of time under a wide variety of conditions. The temperature in an automobile muffler, for example, ranges from ambient temperatures which varies widely throughout the year to temperatures as high as about 2000° F. under certain conditions. The active components of the catalyst must be supported on a base that can resist temperatures of 1500° to 2000° F. without loss of activity.

One particularly satisfactory catalyst system involves the coating of a relatively inert base with a composition having a surface area sufficiently high to insure conversion of the carbon monoxide, hydrocarbons and nitrogen oxides, by the active components of the catalyst. This coating is necessary since the inert base in the form of pills, extrudates or monolithic structures have very low surface areas.

The coating composition may be alumina, mullite or spinel. For purposes of simplicity my invention will describe a system in which alumina is the coating composition.

The alumina coating is normally in the gamma form. One of the problems encountered is that as the temperatures in the catalytic converter increases the gamma (or other transition forms of alumina) undergoes a change to alpha-alumina. This is undesirable because of the loss of surface activity due to the crystallization of the transitional aluminas at high temperatures. This in turn lessens the activity of the catalyst which is contained on the support and affects the catalyst effectiveness. In addition, a support alumina shrinks in volume as the conversion to alpha-alumina takes place at high temperatures.

Various methods have been suggested for combating this problem. U.S. Pat. 3,230,182 of Stiles issued Jan. 18, 1966 describes a process in which the alumina carrier is first treated with a manganese compound and calcined whereupon the manganese oxides form a coating upon the aluminas structure in such a fashion that when the catalyst is heated to elevated temperatures there is a smaller loss in surface area.

One particularly active and satisfactory catalyst system is suggested in U.S. Pat. 3,331,787 to Keith et al., issued July 18, 1967. This patent describes a process for preparing a catalyst by forming an active dispersion of a calcined catalytically active refractory metal oxide and platinum group metal compound and applying the dispersion to the external surfaces of a chemically inert refractory support. The support is preferably in the form of a solid unitary body having a plurality of unobstructed openings therethrough. This catalyst system gives good results but suffers from the problem of loss of catalytic activity in the system on prolonged exposure to high temperatures.

BRIEF DESCRIPTION OF THE INVENTION

We have found that a catalyst having good initial activity and the ability to retain this activity even on exposure to temperatures as high as 1800° F. can be prepared by preparing a slip consisting of an alumina containing compound (alumina, mullite, or spinel) and an additive to impart viscosity and anti-settling characteristics. A binder such as clay, for example, may be needed when certain aluminas are used. This slip is used to coat a relatively inert catalyst base such as pills, extrusions or monolithic structures. The catalytically active components can be added to the slip or may be added at a later stage in the process of preparation of the catalyst. After the slip has been deposited onto the base, the coated base is then heated to temperatures of 1000° to 1400° F. to insure adhesion of the coating to the base and the proper hardness and resistance to attrition of the catalyst material. If the catalytically active components have not been added to the slip, the coated base is then coated with a catalyst for the conversion of carbon monoxide, hydrocarbons, and nitrogen oxides in exhaust gases.

DETAILED DESCRIPTION OF THE INVENTION

The first step of the process is the selection of the proper catalyst support. The slurry or slip is coated onto pills, extrusions, as a support for auto exhaust conversion catalysts. This inert base should be cordierite, spodumene, mullite, or spinel, for example.

The next step of the process is the coating of the support with a slip made up to consist of an alumina containing compound, preferably alumina or mullite, having the desired properties as the principal component. The essential components of the slip are the alumina compound and a water soluble organic resin, that provides proper viscosity and anti-settling characteristics such as carboxymethylcellulose, for example. In some cases such as when alumina trihydrate is used, a binder such as kaolin, for example, must be added.

For purposes of simplicity I will describe the process of my invention using a monolith made up of cordierite as the inert base although obviously equally good results are obtained when the slurry or slip is coated onto pills, extrusions, or other structures that give satisfactory results as catalyst supports. Particularly good results are obtained when gamma alumina is used to prepare the slip.

The process of preparing this alumina is not part of this invention. It is disclosed and discussed in detail in U.S. application 152,388 filed June 11, 1971 and incorporated herein by reference. Broadly speaking, the gamma alumina is prepared by stabilization of transitional aluminas by impregnating the transitional aluminas with 0.1 to about 10 weight percent of at least one (1) rare earth oxide. A particularly convenient source of this rare earth, is a rare earth metal salt such as rare earth chloride solution that contains about 55 weight percent lanthanum, 20 weight percent cerium, 17.3 weight percent neodymium, 6 weight percent promethium and about 1.3 weight percent samarium. Each of these percentages is expressed as the oxide.

A binder need not be used when alpha-alumina monohydrate or gamma alumina is used. When alumina trihydrate is used a binder such as kaolin clay, for example, is required to assure good adhesion of the coating to the support.

The resin used depends on the pH of the alumina slurry. When the pH is above about 6.5 alkaline stable resins such as carboxymethylcellulose, hydroxypropylmethylcellulose, and polyvinylpyrollidone, for example, can be used. Other resins such as gum arabic, the ethylene oxide polymers (commercially available under the trade name of Polyox (poly(ethylene oxide)), hydroxyethylcellulose, and the polyacrylamides, for example, give good results at lower pH's of about 3.5.

These resins are used for viscosity stabilization, and as an anti-settling agent.

When mullite is used to prepare the slip a different procedure is used. Mullite is prepared from a mixture of silica and alumina. Mullite formation is completed by heating to a temperature of 1600° to 2100° F. for periods of 1 to 3 hours. Prior to this heating step the product is a mixture of silica and alumina.

This heating step to complete mullite formation is preferably completed before the slip is formed.

The next step of the process is preparation of a slip of the coating material. A typical slip is prepared by mixing 30–45 weight percent alumina; 37–45 weight percent water; and 15–20 weight percent of a 0.5 percent solution of a water soluble resin and 3–5 weight percent of a strong mineral acid. The acid is added to reduce the pH to avoid dilatency and provide a more fluid slip. Suitable acids include hydrochloric, nitric, sulfuric, etc. A slip made up using this technique has a pH of about 3.0 to 3.5 and a viscosity (measured on a Brookfield viscometer) of about 50 centipoises (cps.).

The next step of the process is coating the catalyst base structure with the slip. The slip is coated onto a monolithic structure, for example, at 16–18 percent coating (based on the weight of the monolith). This produces a coating that has a surface area of 15–25 square meters per gram.

The active ingredients for preparation of the catalyst may be added to the slurry used to prepare the slip or the structure may be impregnated in the next step. After the monolith is coated it is dried at a temperature of 300° to 400° F. for about 1 to 2 hours and heated to a temperature of about 850° to 1400° C., preferably 1000°–1200° F. for about 1–3 hours, preferably about 1 hour.

The final step of the process may be the impregnation of the coating of the monolith with a suitable catalyst. Several catalyst systems will give satisfactory results such as the platinum metal groups and/or oxides of copper, cobalt, manganese, nickel, and iron, or a combination of oxides. These catalysts are added as solutions of metal salts and as solutions of an acid wherein the metal is the anion component of the acid. These catalysts are normally prepared as separate systems since the function of the catalyst is different. The catalysts that normally give good results in reducing the carbon monoxide and hydrocarbon emission levels are not particularly active for the reduction of the nitrogen oxide emissions in the automobile exhaust gases.

My invention is further illustrated by the following but unlimiting examples:

Example 1

This example illustrates a method of preparing the slip or coating of a monolithic structure.

The slip was prepared from the rare earth stabilized alumina described in detail in application Ser. No. 152,388 referred to previously. The rare earth chloride mixture was made up using this technique in a commercially available mixer. The effluent from the mixer was dried, sized to pass through the venturi opening of a fluid energy mill and ground in an 8'' fluid energy mill operated at a temperature of 400° to 600° F. and a pressure of 225 pounds per square inch with air as the grinding fluid. The alumina mixture was fed to the mill at the rate of 150 grams per minute. The product recovered from the mill was stabilized in the gamma form by heating to a temperature of 1400° to 1800° F. for a period of 3 hours.

The slip was prepared by mixing 192 grams of the rare earth stabilized gamma alumina, 8 grams of HCl and 260 grams of a 0.5 percent solution of poly(ethylene oxide). The slip contained 41.8 percent solids and had a pH of 3.8 and a viscosity of 100 cps. A 16–18 percent coating having a surface area of 15–25 square meters per gram was applied to an inert base.

Example 2

This example illustrates the preparation of a slip containing platinum as the active catalytic component.

A total of 476 grams of the rare earth stabilized alumina, 750 grams of a 0.5% solution of a poly(ethylene oxide) and 5 grams of hydrochloric acid, 38 grams of chloroplatinic acid ($H_2PtCl_6 \cdot 6H_2O$) and 324 grams of water. The mixture was stirred and hydrogen sulfide was added to convert the platinum to the sulfide ($PtS_2$).

The slip had a solids content of 31.3 percent and contained 0.925 percent as platinum. The pH was 3.9 and the viscosity was 120 cps. A sufficient quantity of this slip was coated on a monolithic structure to give a final platinum content of 0.2 to 0.4 percent (as Pt). The coated monolith was dried and activated by heating to a temperature of 1000 to 1200° F. and was used as an auto exhaust conversion catalyst.

Example 3

This example illustrates the method of preparing a monolithic structure wherein palladium was the active catalyst.

A total of 648 grams of rare earth stabilized alumina prepared as described above was mixed with 935 grams of 0.5 percent solution of poly (ethylene oxide), 7 grams of nitric acid and 200 grams of water. A total of 210 ml. of a palladium nitrate solution prepared to contain 0.1 gram of palladium per ml. was added. The resulting slip had a solids content of 33.7 percent, a pH of 4.0, a viscosity of 130 cps. and contained 1.05 percent as palladium.

A monolithic structure was coated to ½ its length with the above palladium slip. A sufficient quantity was used to give a palladium content of 0.175 percent palladium. The monolith was then dried at 300° F. The remaining uncoated section of the monolith was coated with the platinum slip described in Example 2 to give approximately 0.175 percent platinum. The coated monolith was dried and activated at a temperature of 1000° to 1200° F.

This catalyst is useful as a composite catalyst for converting the hydrocarbon and carbon monoxides in the auto exhaust gases.

This catalyst is particularly advantageous when it is positioned in a muffler so that the palladium coated section is exposed to the engine exhaust gases first. In one run, the catalyst became active in a period of only 25 seconds and reached the 50 percent conversion level after 65 seconds.

In contrast when the monolith was positioned in the muffler so that the platinum section was exposed to the exhaust gases first, the catalyst did not become active until exposed to the exhaust gases for 85 seconds. The 50 percent conversion level was not reached for a period of 125 seconds.

This phenomenon is due to the fact that during engine start up there is a considerable amount of carbon monoxide given off. Platinum at low temperatures and high CO levels is poisoned by carbon monoxide and this affects the activity of the catalyst until the heat generated by combustion in the engine warms up the catalyst. Palladium on the other hand is not affected by CO poisoning.

Example 4

This example illustrates the preparation of a slip in which the stabilizing agent was 10 percent cerium oxide.

The alumina was prepared according to the process described in Example 1 with the exception that a sufficient quantity of the cerium chloride solution to impart a 10 percent cerium oxide concentration to the alumina that was added. A total of 175 grams of this cerium stabilized gamma alumina was used to prepare a slip by adding 200 grams of water and 2 grams of hydrochloric acid. The slip had a solids content of 45.7 percent, a pH of 4.1 and a viscosity of 150 cps. It was used to coat a monolith to give a 16-20 percent coating.

Example 5

A slip was prepared from an alumina that was not stabilized and the stability of the catalyst after heating for three (3) hours at a temperature of about 1000° to 2000° F. was compared.

A total of 5000 grams of washed, spray-dried, alumina hydrogel was passed into a fluid energy mill operated at a temperature of 600° F. and a pressure of 225 pounds per square inch. The alumina was fed to the mill at a rate of 150 grams per minute. The product was collected and calcined at 1400° F. to convert the alumina to gamma alumina. A slip was made up using the techniques described previously. The slip had a solids content of 42 percent, a pH of 3.5 and a viscosity of 50 cps. The slip was coated onto a monolithic structure at a 16-18 percent coating. The product had a surface area of 15-25 square meters per gram. The coated monolith was impregnated with a sufficient quantity of platinum to give a platinum content of 0.35 percent platinum. The conversion for hydrocarbon and carbon monoxide of the 2 catalyst systems is set out in the table below:

TABLE 1.—CONVERSION OF HYDROCARBONS AND CARBON MONOXIDE

| 3 hours at temperature of— | Catalyst of— | |
|---|---|---|
| | Example 5 | Example 2 |
| 1,000° F | 95-98 | 95-98 |
| 1,600° F | 40-50 | 90-95 |
| 1,800° F | 10-20 | 60-70 |
| 2,000° F | 0 | 40-50 |

It is obvious from the review of these data that the catalyst prepared using the stabilized alumina contained a considerable proportion of its activity even after being exposed to temperatures of 2000° F. for periods of three (3) hours. The unstabilized alumina, on the other hand, lost essentially all of its activity after being exposed to temperatures of 1800° F. and was completely inactive after being exposed to temperatures of 2000° F. for periods of three (3) hours.

Example 6

Mullite was prepared by mixing the components in the proper proportions and heating to 1800°-2100° F., to complete mullite formation and stabilize the structure.

A slip was prepared using mullite as the principal component by adding 900 grams of mullite and 60 grams of nitric acid to 1400 grams of water. The resulting slip had a solids content of 37.5 percent, a pH of 1.4 and a viscosity of 300 cps. It gave an 18-22 percent coating of the support.

In an alternate procedure the slip is made up from the mullite precursor and the coated monolith heated to 1800° to 2100° F. The mullite coating had a surface area of 75 to 125 square meters per gram.

Example 7

In this example, a slip was prepared in which mullite was the principal component. 100 grams of mullite was added to 270 grams of water, 40 grams of ammonium hydroxide [concentrated ammonium hydroxide solution] and 9.05 grams of a palladium salt (palladium tetraamine dinitrate) was made into a slip. The slip contained 26 percent solids and was used to prepare a 10-12 percent coating on the monolithic support. The slip had a viscosity of 175 cps.

Example 8

This example illustrates the preparation of a slip containing several catalytic components.

A total of 121.2 grams of copper nitrate $$Cu[NO_3]_2 \cdot 3H_2O$$

145.8 grams of nickel nitrate $Ni[NO_3]_3 \cdot 9H_2O$ dissolved in 119.72 grams of water. Six grams of nitric acid was added along with 105.2 grams of the gamma stabilized alumina. The resulting slip gave an 18-20 percent coating on the monolith and after drying at 250° F. and activating at approximately 850° F. followed by a reduction in carbon monoxide at 800° F. gave an active catalyst for the reduction of nitrogen oxides in auto exhaust gas emission.

What is claimed is:

1. A process for preparing an automotive exhaust catalyst system capable of retaining high catalytic activity on exposure to temperatures above about 1500° C. for protracted periods of time which comprises:
   (a) preparing nodules, extrudates, or monoliths or an inert base material,
   (b) preparing a slurry containing:
      (1) an aluminum containing compound selected from the group consisting of alumina and mullite stabilized with a rare earth metal salt,
      (2) a water soluble organic resin having viscosity stabilization and anti-settling properties, and
      (3) a catalytic metal compound selected from the group consisting of metal salts and an acid of a metal wherein the metal is the anion component of the acid,
   (c) coating said inert base material with said slurry,
   (d) drying, calcining and recovering the product.

2. The process according to claim 1 wherein the inert base material is in the form of a monolith and is coated to provide a coating comprising about 10 to 20 percent, based on the weight of the monolith, by dipping the monolith in the slurry.

3. The process according to claim 1 wherein coated nodules extrudates, or monoliths are dried by heating to a temperature of about 300-400° C. for 1-2 hours followed by calcining at a temperature of 1000-1200° F. for 1 to 3 hours.

4. A process preparing an automotive exhaust catalyst system capable of retaining high catalytic activity on exposure to temperatures of above 1500° C. for protracted periods of time which comprises:
   (a) preparing a monolith structure,
   (b) preparing a slurry containing alumina, stabilized in the gamma phase with rare earth metal salts, a water soluble organic resin having viscosity stabilization and anti-settling properties and an active catalytic component selected from the group consisting of metal salts and an acid of a metal wherein the metal is the anion component of the acid,
   (c) dipping said monolith in said slurry for a time sufficient to coat said monolith with a coating comprising about 10-20 percent based on the weight of the monolith,
   (d) drying the coated monolith by heating to a temperature of 300-400° C. for a period of 1 to 2 hours, followed by calcining at a temperature 1000-1200° F. for 1 to 3 hours, and recovering the product.

5. The process according to claim 1 wherein said slurry has a pH of 1 to 4.5.

References Cited

UNITED STATES PATENTS

| | | | |
|---|---|---|---|
| 3,322,491 | 5/1967 | Barrett et al. | 252—462 X |
| 3,377,269 | 4/1968 | Bloch | 252—477 R |
| 3,397,154 | 8/1968 | Talsma | 252—465 X |
| 3,226,340 | 12/1965 | Stephens et al. | 252—462 X |
| 3,259,454 | 7/1966 | Michalko | 423—214 |
| 3,304,150 | 2/1967 | Stover et al. | 423—213 |

DANIEL E. WYMAN, Primary Examiner

W. J. SHINE, Assistant Examiner

U.S. Cl. X.R.

252—430, 465, 466 PT; 423—213, 214